United States Patent
Kim (10) Patent No.: US 7,218,362 B2
(45) Date of Patent: May 15, 2007

(54) LIQUID CRYSTAL DISPLAY MODULE HAVING REMOVABLE PRINTED CIRCUIT BOARD

(75) Inventor: Hyo-Jin Kim, Kyoungsangnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/892,789

(22) Filed: Jun. 28, 2001

(65) Prior Publication Data

US 2002/0036745 A1    Mar. 28, 2002

(30) Foreign Application Priority Data

Sep. 2, 2000    (KR) ............................... 2000-51876

(51) Int. Cl.
G02F 1/1333    (2006.01)

(52) U.S. Cl. ....................................................... 349/58

(58) Field of Classification Search ........ 349/149–152, 349/58–60; 361/93.3, 748, 736
See application file for complete search history.

(56) References Cited

U.S. PATENT DOCUMENTS 4,772,100 A * 9/1988 Suenaga ..................... 349/58
5,889,572 A * 3/1999 Takahashi et al. ........... 349/149
5,909,359 A * 6/1999 Summers et al. ............ 361/748
5,963,287 A * 10/1999 Asada et al. ................. 349/150
6,307,530 B1 * 10/2001 Cho ............................. 345/87
6,330,148 B1 * 12/2001 Won et al. .................... 361/681

* cited by examiner

*Primary Examiner*—Dung T. Nguyen
(74) *Attorney, Agent, or Firm*—Morgan, Lewis & Bockius LLP

(57) ABSTRACT

A liquid crystal display module includes a liquid crystal panel, a first frame, a second frame, a first printed circuit board, and a second printed circuit board. The liquid crystal panel has an upper substrate, a lower substrate, and a liquid crystal layer disposed between the upper and lower substrates. The first printed circuit board is electrically connected with the liquid crystal panel. The second printed circuit board is electrically connected with the first printed circuit board such that the second printed circuit board is removable from the first printed circuit board and is used for driving the liquid crystal panel. The first printed circuit board and the second printed circuit board are formed on the first frame, wherein the second printed circuit board is removable from the first frame. A second frame is coupled with the first frame with the liquid crystal panel fixed therebetween.

16 Claims, 13 Drawing Sheets

LIQUID CRYSTAL DISPLAY MODULE HAVING REMOVABLE PRINTED CIRCUIT BOARD

This application claims the benefit of Korean patent application No. 2000-51876, filed Sep. 2, 2000 in Korea, which is hereby incorporated by reference.

BACKGROUND OF THE INVENTION

1. Field of the Invention

The present invention relates to a liquid crystal display device, and more particularly, to a liquid crystal display (LCD) device implementing removable printed circuit board.

2. Discussion of the Related Art

Liquid crystal displays (LCDs) are gaining in popularity for use in systems such as television receivers, computer monitors, avionics displays, aerospace displays, and other military-related displays where the elimination of cathode ray tube (CRT) technology is desirable for several reasons. In particular, CRTs are characterized by large depth dimensions, undesirably high weight, and fragility. Additionally, CRTs require a relatively high voltage power supply to sufficiently accelerate electron beams for displaying images.

Figure 1:
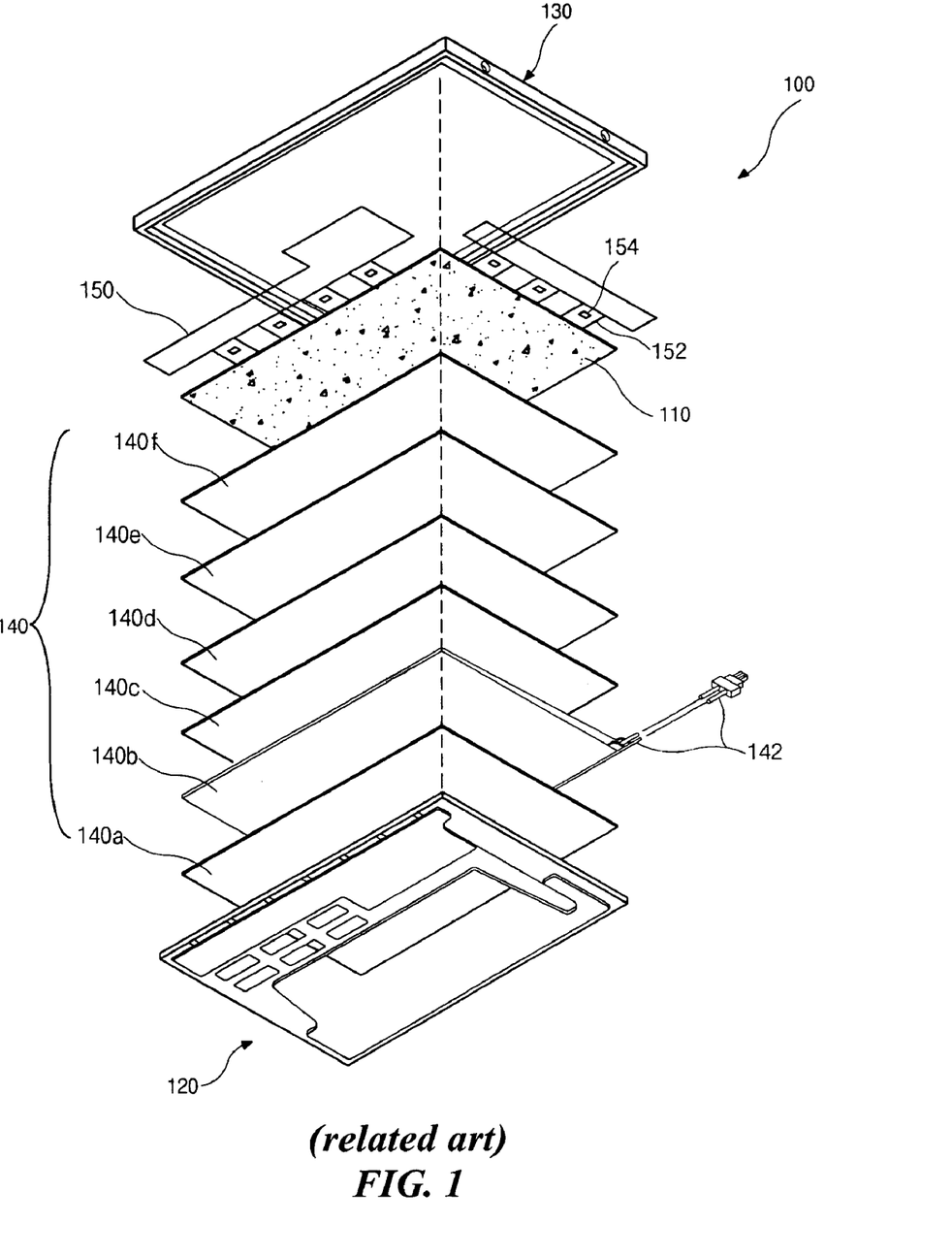
FIG. 1 is an exploded perspective view illustrating the assembly of related art of a liquid crystal display module.

As shown in FIG. 1, a typical liquid crystal display module 100 includes a liquid crystal panel 110, a lower frame 120, an upper frame 130, and a back light unit 140. The liquid crystal panel 110 has an upper substrate, a lower substrate, and a liquid crystal layer interposed therebetween. The lower frame 120 is disposed under the liquid crystal panel 110 to support the liquid crystal panel 110, and the upper frame 130 is disposed over the liquid crystal panel 110 to press the liquid crystal panel 110, thereby fixing the liquid crystal panel 110 between the lower and upper frames 120, 130. The back light unit 140 serves as a light source to provide light rays for the liquid crystal panel 110. The lower frame 120 is usually a plastic and supports the back light unit 140 as well as the liquid crystal panel 110.

The upper substrate (not shown) of the liquid crystal panel 110 has a color filter, a black matrix, and a common electrode. The color filter colors the light rays that radiate from the back light unit 140 as the light rays pass through the liquid crystal layer of the liquid crystal panel 110. The black matrix blocks needless portions of the rays. The lower substrate (not shown) of the liquid crystal panel 110 has a switching element and a pixel electrode. A thin film transistor (TFT) is generally used as the switching electrode. Together with the common electrode of the upper substrate, the pixel electrode applies an electric field to the liquid crystal layer. The liquid crystal panel 110 further has an upper polarizer (not shown) and a lower polarizer (not shown), that are respectively formed on the upper substrate and the lower substrate.

Figure 2:
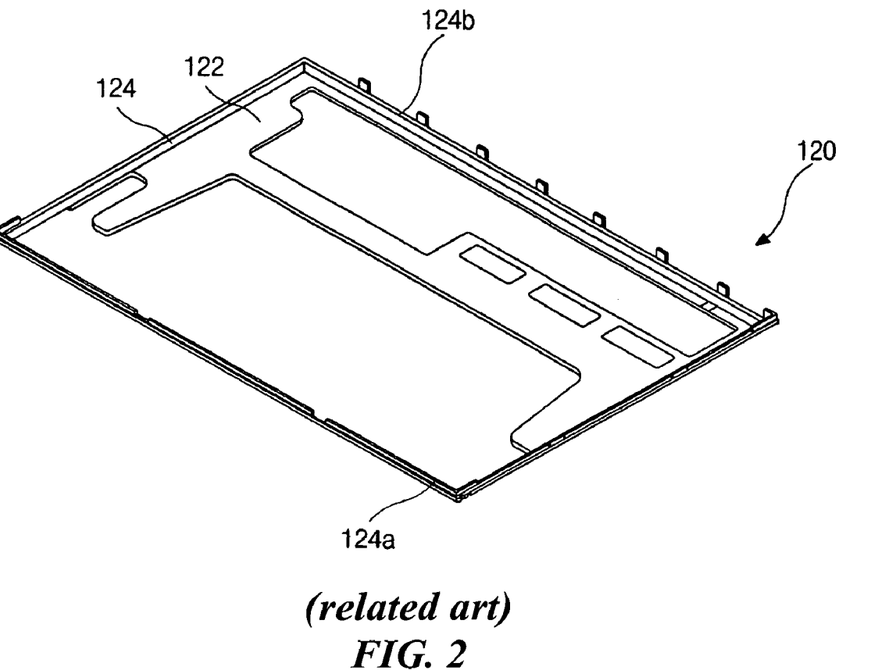
FIG. 2 is a perspective view illustrating a lower frame of the liquid crystal display module of FIG. 1.

As shown in FIG. 2, the lower frame 120 has a base plate 122 and four side walls 124 that are respectively connected with the four side edges of the base plate 122. A front side wall 124a specifically serves to support the back light unit 140 shown in FIG. 1.

Figure 3:
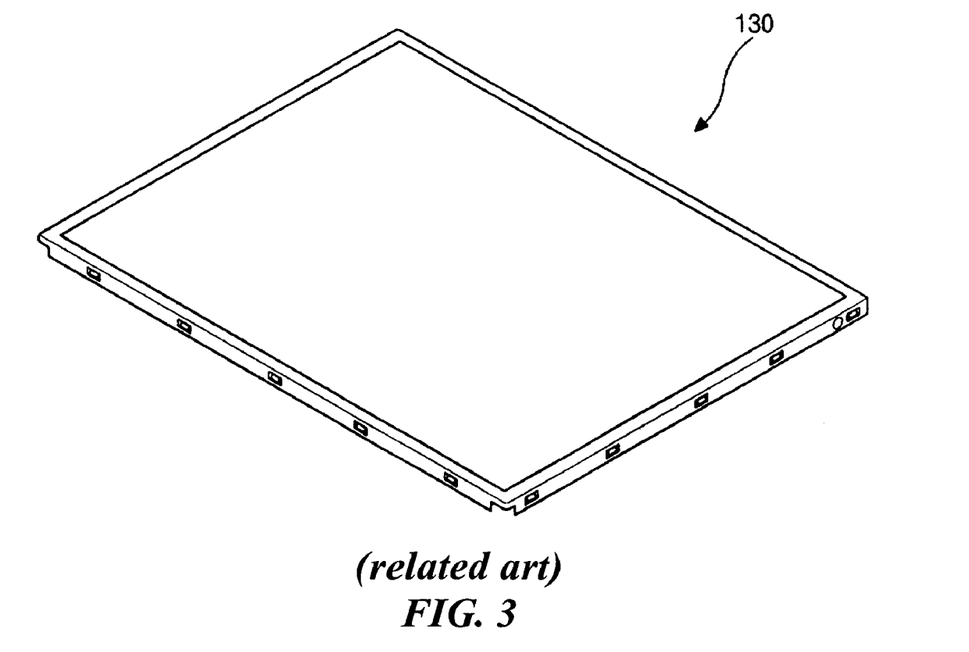
FIG. 3 is a perspective view illustrating an upper frame of the liquid crystal display module of FIG. 1.

FIG. 3 shows the upper frame 130 which is generally made of metal. The upper frame 130 has the shape of a rectangular doughnut, and each side edge thereof has an L-shaped section. The side edges of the upper frame 130 surround the liquid crystal panel 110, and are coupled to the lower frame 120.

Returning to FIG. 1, the back light unit 140 has a reflector 140a, a light guide 140b, a first diffusing or protecting film 140c, a first prism sheet 140d, a second prism sheet 140e, a second diffusing or protecting film 140f, and a lamp 142. The lamp 142 produces light rays such that the rays are provided to the liquid crystal panel 110.

Figure 4:
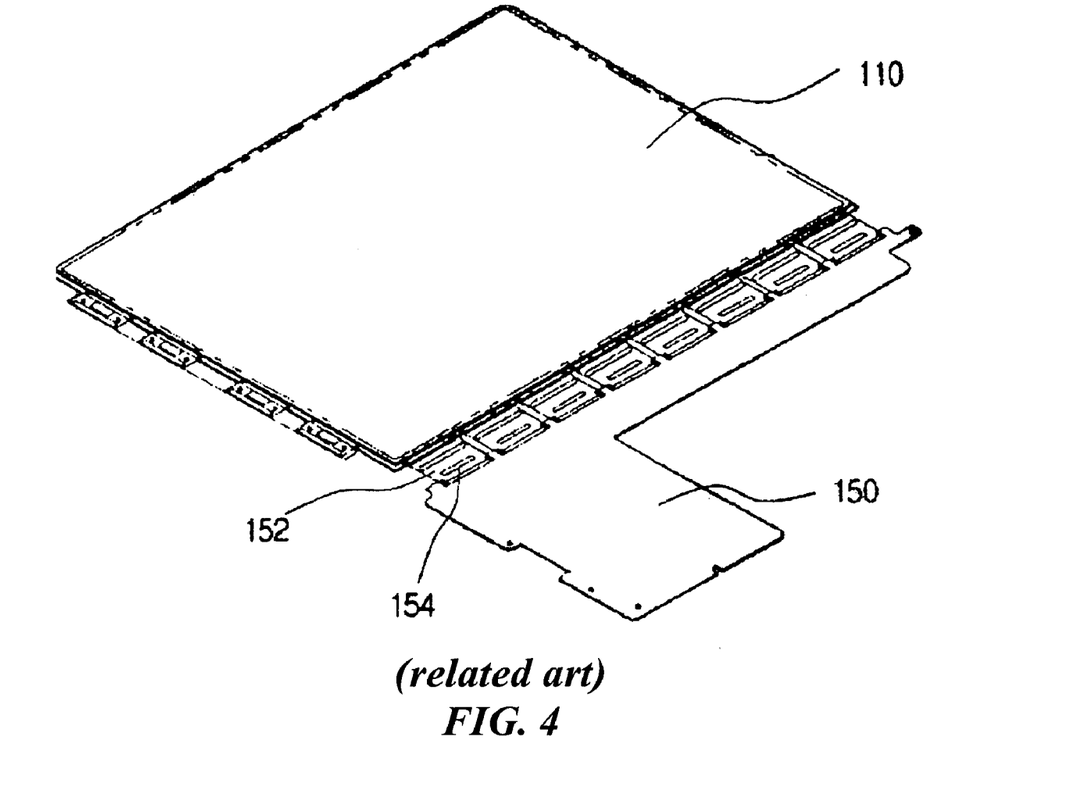
FIG. 4 is a perspective view illustrating a PCB and a liquid crystal panel of the liquid crystal display module of FIG. 1.

The liquid crystal display module 100 of FIG. 1 further includes a printed circuit board (PCB, reference 150 of FIG. 4) where driving circuits are installed to drive the liquid crystal display module 100. As shown in FIG. 4, the PCB 150 is electrically connected with the liquid crystal panel 110 via a tape carrier package (TCP) 152 (usually a flexible film). A drive IC (integrated circuit) 154 is installed in the TCP 152.

Returning now to FIG. 1, a process for assembling the above-described liquid crystal display module 100 will now be explained.

At first, all the elements of the back light unit 140 are sequentially mounted on the lower frame, and the liquid crystal panel 110 is mounted on the back light unit 140. After the liquid crystal panel 110 is properly adjusted such that the lower frame 120 can support it, the upper frame 130 is aligned over the lower frame 120 and pressed on such that the liquid crystal panel 110 is fixed therebetween. At this point, the PCB 150 is bent along a rear side edge 124b (of FIG. 2) of the lower frame 120 such that it is fixed on the lower surface of the back light unit 140. Screws or double-coated tapes are usually used for fixing the PCB 150.

The above-described liquid crystal display module 100 has a disadvantage in repairing. That is to say, if defects occur in the PCB 150, the liquid crystal display module 100 must be disassembled via a complicated process to repair the PCB 150, and then reassembled after the repairing. As a result, a liquid crystal display module 100 having a defective PCB 150 is often exchanged with a new one. Further, during reassembly after repair, the screws or double-coated tapes may cause contamination in the back light unit 140, thereby resulting in deteriorated display quality.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device that is easy and safe to repair without deteriorating display quality.

Another object of the present invention is to provide a liquid crystal display device that can be fabricated with low cost at high yields.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module includes a liquid crystal panel including an upper substrate, a lower substrate, and a liquid crystal layer interposed between the upper and lower substrates, a first frame on which a first printed circuit board and a second printed circuit board are formed, and a second frame coupled with the first frame such that the liquid crystal panel is fixed between the first and second frames, wherein the first printed circuit board is formed on the first frame and is electrically connected with the liquid crystal panel, the second printed circuit board is formed on the first frame and is electrically connected to the first printed circuit board to drive the liquid crystal panel, and the second printed circuit board being removable from the first printed circuit board and the first frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which are illustrated in the accompanying drawings.

Figure 5:
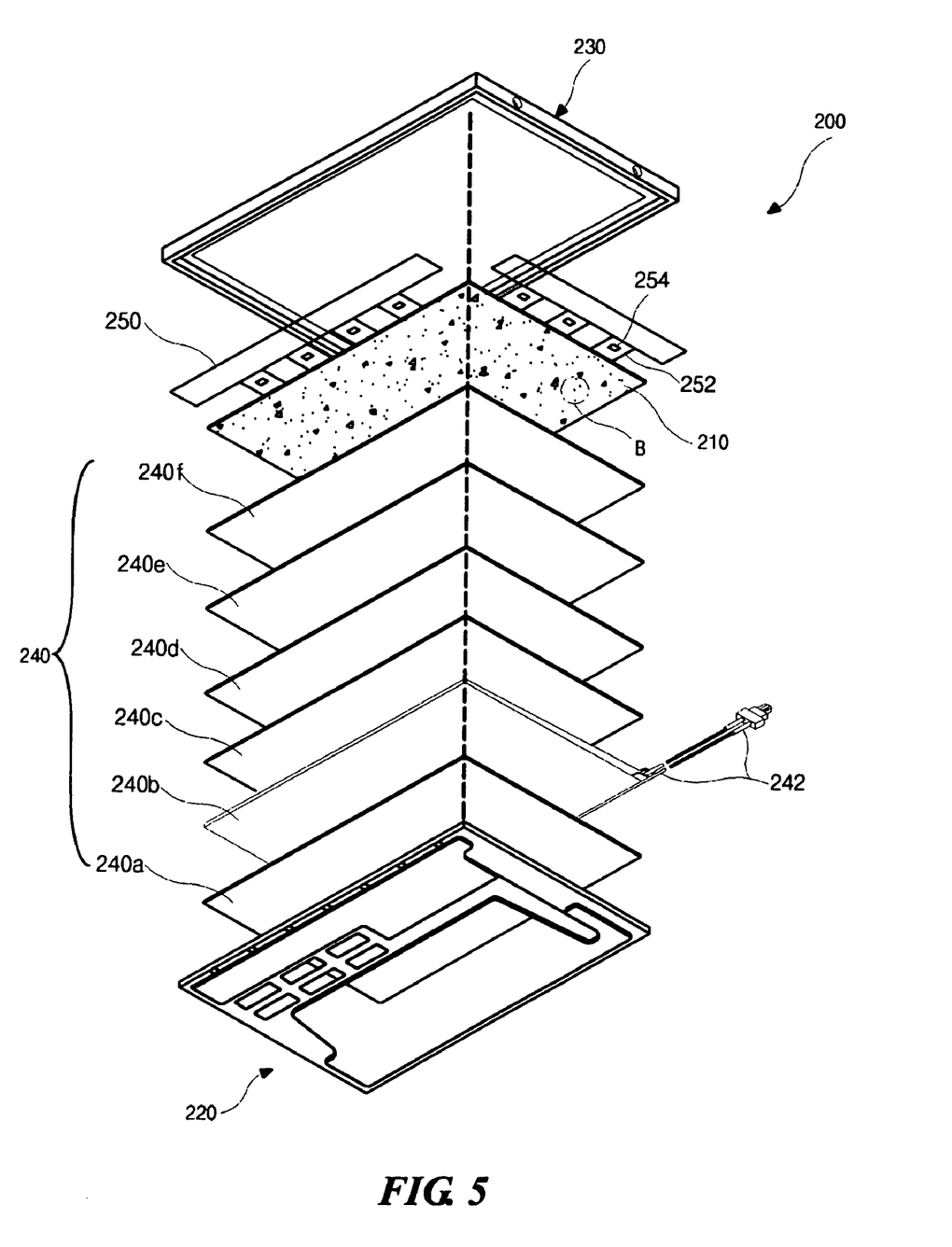
FIG. 5 is an exploded perspective view illustrating the assembly of an exemplary liquid crystal display module according to the present invention.
Figure 16:
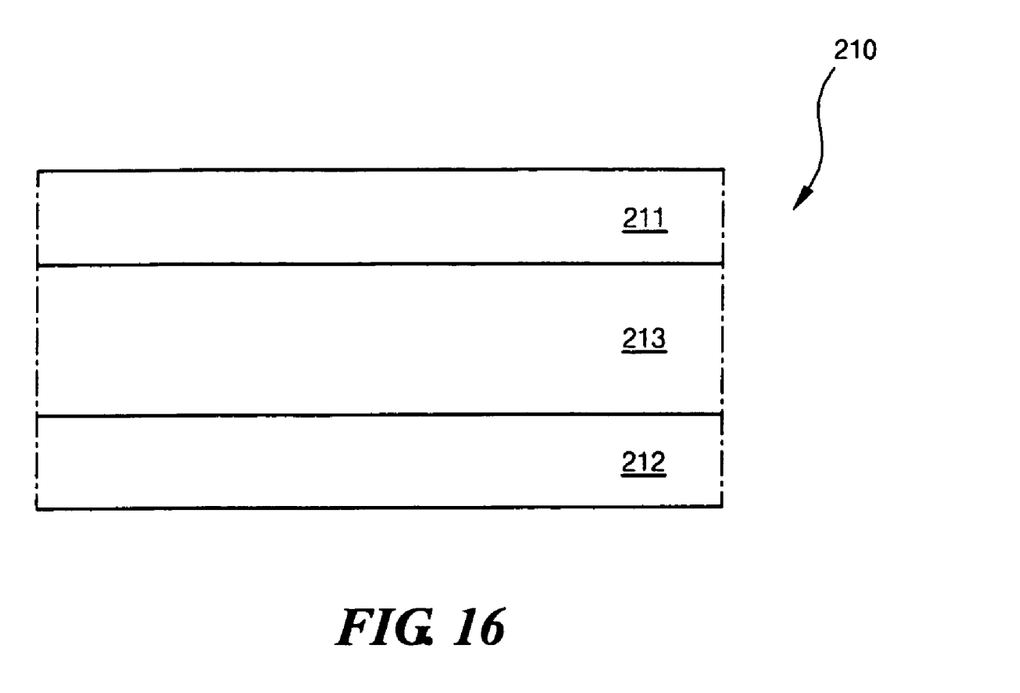
FIG. 16 is an expanded view illustrating a portion "B" of FIG. 5.

As shown in FIG. 5, an exemplary liquid crystal display module 200 according to the present invention includes a liquid crystal panel 210, a lower frame 220, an upper frame 230, and a back light unit 240. As shown in FIG. 16, the liquid crystal panel 210 has an upper substrate 211, a lower substrate 212, and a liquid crystal layer 213 interposed therebetween. The lower frame 220 is disposed under the liquid crystal panel 210 to support the liquid crystal panel 210. The upper frame 230 is disposed over the liquid crystal panel 210 to press on the liquid crystal panel 210, thereby fixing the liquid crystal panel 210 between the lower and upper frames 220 and 230. The lower frame 120 is usually a plastic, and serves to support the back light unit 140 as well as the liquid crystal panel 110. The back light unit 240 serves as a light source for the liquid crystal panel 210. The lower frame 220 may be made of plastic and supports the back light unit 240 as well as the liquid crystal panel 210.

The upper substrate (not shown) of the liquid crystal panel 210 has a color filter, a black matrix, and a common electrode. The color filter colors light radiating from the back light unit 240 into the liquid crystal layer of the liquid crystal panel 210. The black matrix blocks needless portions of the light. The lower substrate (not shown) of the liquid crystal panel 210 has a switching element and a pixel electrode. A thin film transistor (TFT) is preferably used as the switching electrode. Together with the common electrode of the upper substrate, the pixel electrode applies an electric field to the liquid crystal layer. The liquid crystal panel 210 further has an upper polarizer (not shown) and a lower polarizer (not shown) respectively formed on the upper substrate and the lower substrate.

Figure 6:
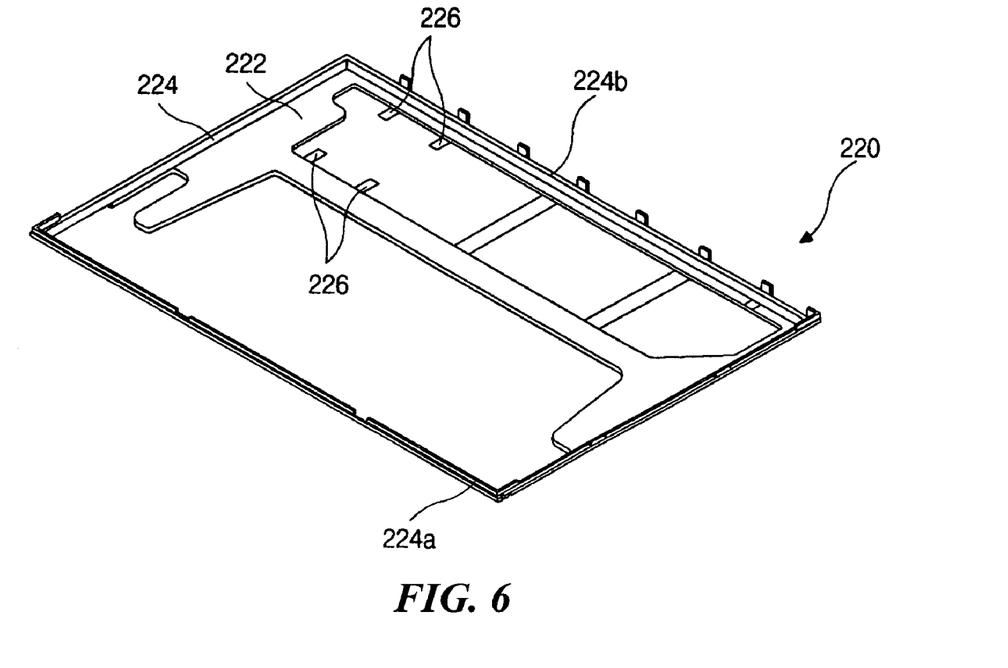
FIG. 6 is a perspective view illustrating a lower frame of the liquid crystal display module of FIG. 5.

As shown in FIG. 6, the lower frame 220 has a base plate 222 and four side walls 224, which are respectively connected with the four side edges of the base plate 222. A front side wall 224a supports the back light unit 240 shown in FIG. 5. Opposite to the front side wall 224a, a rear side wall 224b is formed.

Figure 10:
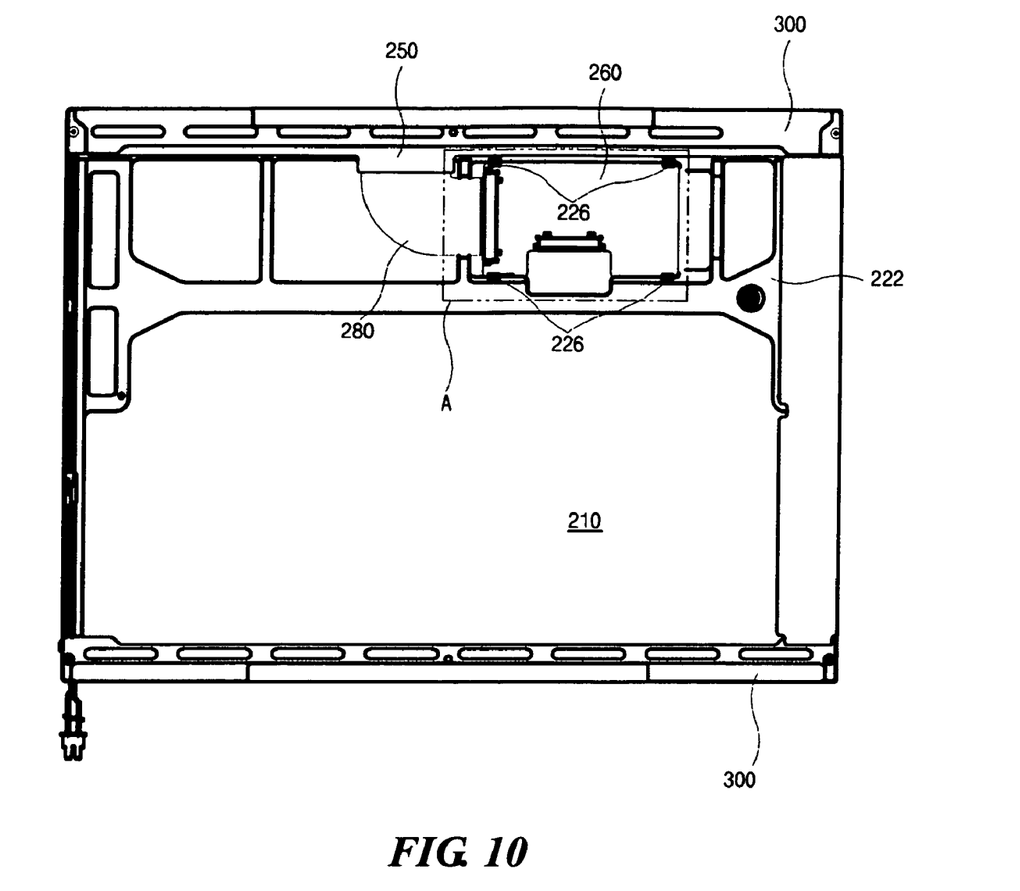
FIG. 10 is a bottom plan view illustrating the liquid crystal display module of FIG. 5.

The base plate 222 has protrusions 226 to fix a control printed circuit board (PCB) 260 (of FIG. 10). Preferably, four protrusions 226 are formed surrounding a region where the control PCB 260 will be disposed. Each protrusion 226 may be bent to have the shape of a capsized letter "L" or the shape of a hook. That is, as shown in FIG. 15B, the protrusion 226 may have a perpendicular portion 226a and a parallel portion 226b defining an angle of about 90 degrees therebetween. The perpendicular portion 226a protrudes perpendicular to a bottom surface 222a of the base plate 222, and the parallel portion 226b extends parallel with the bottom surface 222a such that the protrusion 226 has the shape of the hook. An exemplary perpendicular portion 226a may have the same height as the thickness of the control PCB 260 such that the control PCB 260 cannot move after fixed by the protrusion 226. The protrusion 226 may have various shapes only to fix the control PCB 260 properly.

Figure 7:
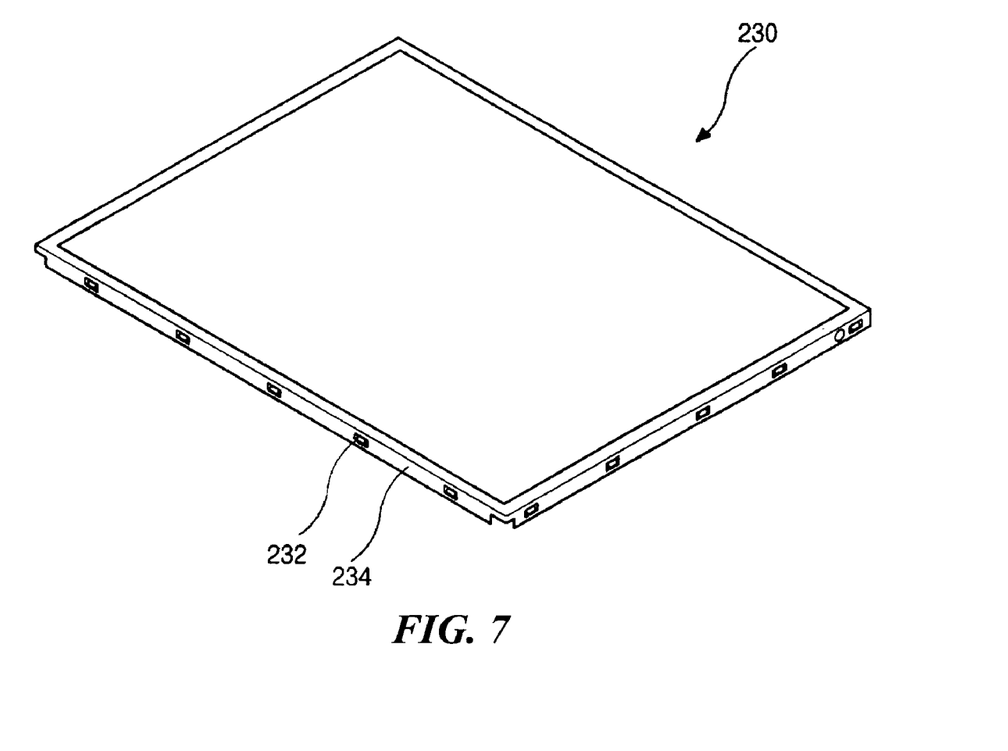
FIG. 7 is a perspective view illustrating an upper frame of the liquid crystal display module of FIG. 5.

FIG. 7 shows the upper frame 230 made of metal, for example. The upper frame 230 has the shape of a rectangular doughnut, and each side edge thereof includes a side wall 234 so as to have an L-shaped section. The side edges of the upper frame 230 surround the liquid crystal panel 210, and are coupled with the lower frame 220. A plurality of flexible concavities 232 are formed on each side wall 234 to couple with the lower frame 220.

Returning to FIG. 5, the back light unit 240 has a reflector 240a, a light guide 240b, a first diffusing or protecting film 240c, a first prism sheet 240d, a second prism sheet 240e, a second diffusing or protecting film 240f, and a lamp 242. The lamp 242 produces light to the liquid crystal panel 210.

Figure 8:
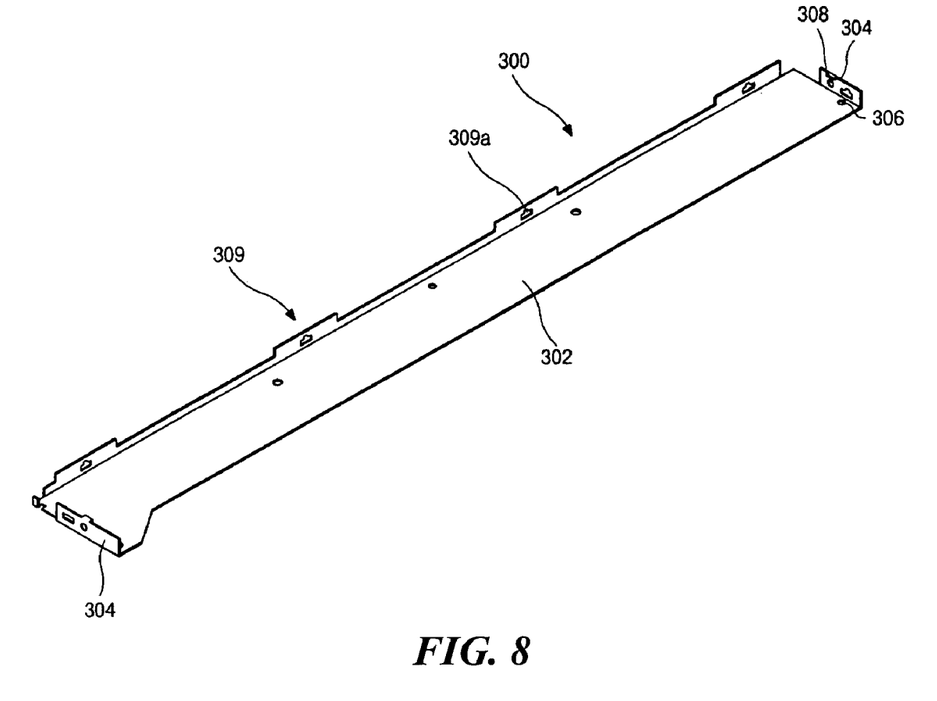
FIG. 8 is a perspective view illustrating a lower cover of the liquid crystal display module of FIG. 5.

The liquid crystal display module 200 of the present invention further includes a lower cover 300 shown in FIG. 8. The lower cover 300 has a main portion 302 and auxiliary portions 304 that are bent perpendicular to the main portion 302. A first screw hole 306 is formed passing through the main portion 302, and a second screw hole 308 is formed passing through the bent portion 304. The first screw hole 306 couples the lower cover 300 with the lower frame 220, and the second screw hole 308 couples the lower cover 300 with the upper frame 230.

In addition, a side wall 309 is formed along a side edge of the lower cover 300. The side wall 309 is also bent perpendicular to the main portion 302 protects the lamp 242 (of FIG. 5) of the back light unit 240 (of FIG. 5) or protects the bent portion of a TCP 252 (of FIG. 9). A coupling segment 309a is formed on the side wall 309 to couple the lower cover 302 with the upper cover 230.

Lower cover 300 supports the lower frame 220 along a long direction of the lamp 242 (of FIG. 5) of the back light unit 240 to prevent bending or wrinkling the lower frame 220. Therefore, stainless steel, such as SUS, is used as the material of the lower cover 300. The lower cover 300 may be disposed opposite to the lamp 242 (of FIG. 5) so as to correspond to the position of a PCB (reference 270 of FIG. 9). Alternatively, two lower covers 300 may be used to support the lower frame 220 along both directions of the lamp 242 and the PCB 270.

Figure 9:
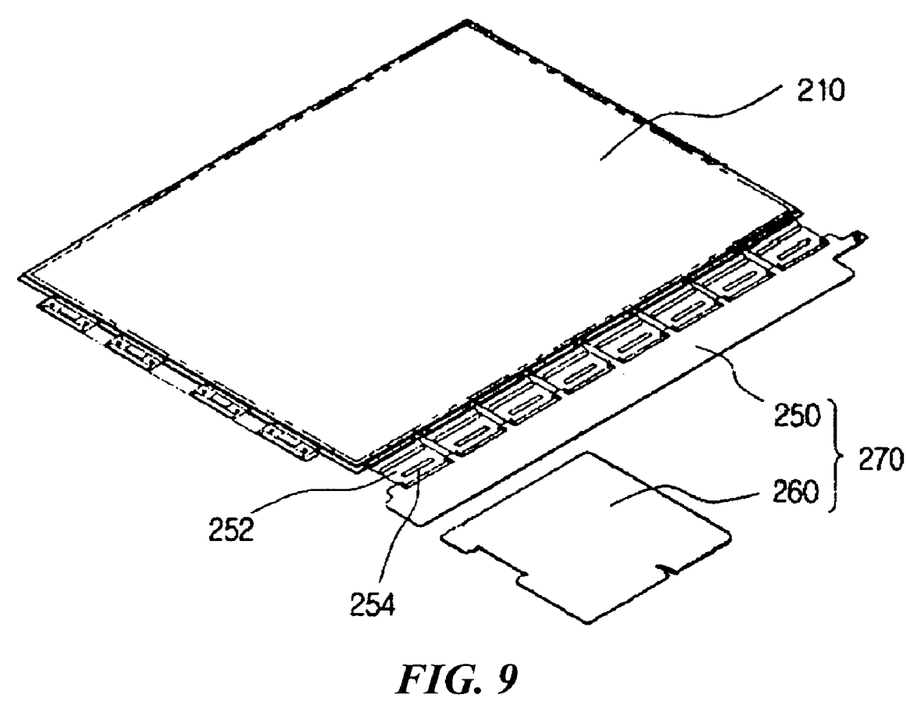
FIG. 9 is a perspective view illustrating a PCB and a liquid crystal panel of the liquid crystal display module of FIG. 5.

The liquid crystal display module 200 of FIG. 5 further includes the printed circuit board (PCB) 270 (of FIG. 9) having driving circuits to drive the liquid crystal display module 200. As shown in FIG. 9, the PCB 270 may be divided into a sourcePCB 250 and the control PCB 260. The control PCB 260 is electrically connected with source PCB 250 via a flexible printed circuit (FPC) 280 (of FIG. 10) and a connector 330 (of FIG. 12A). The source PCB 250 is electrically connected with the liquid crystal panel 210 via the tape carrier package (TCP) 252, which may include a flexible film. A drive IC (integrated circuit) 254 is installed in the TCP 252. In addition, main drive circuit elements to drive the liquid crystal panel 210 are installed on the control PCB 260.

Regardless of the electrical connection via the FPC and the connector, the control PCB 260 and the source PCB 250 are preferably independent of each other. Therefore, the control PCB 260 can be electrically separated from the source PCB 250 by removing the FPC 280 (of FIG. 10) from the connector 330 (of FIG. 12A) of the control PCB 260. Accordingly, the FPC 280 (of FIG. 10) is just pulled out from the connector 330 (of FIG. 12A) of the control PCB 260 for the separation between the control PCB 260 and the source PCB 250. Therefore, when a defect occurs in the main drive circuit elements of the control PCB 260, the control PCB 260 is easily removed from the source PCB 250 to repair the defects.

Figure 11:
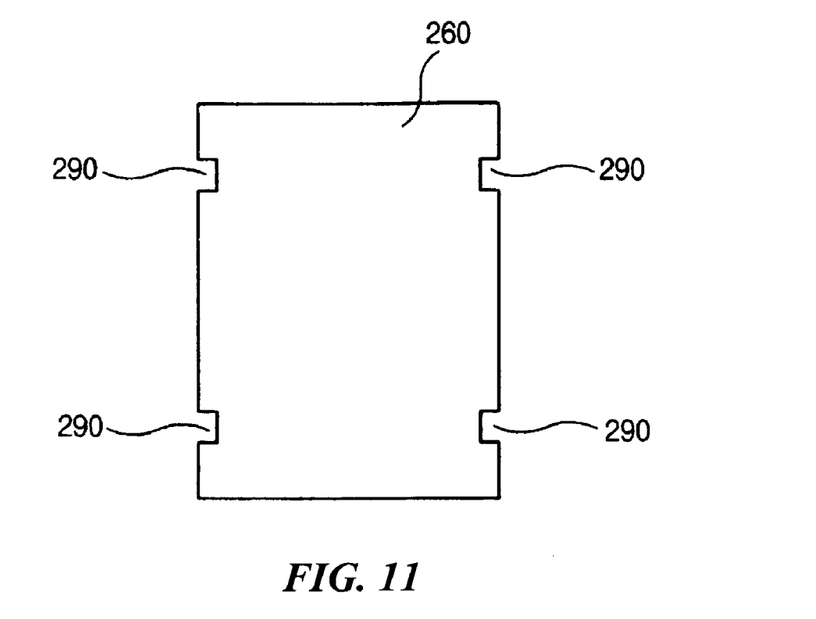
FIG. 11 is a plan view illustrating an exemplary second printed circuit board according to the present invention.

With reference to FIG. 11, the structure of the control PCB 260 will now be explained in detail.

As shown in FIG. 11, notches 290 are formed at right and left side edges of the control PCB 260. The positions of the notches 290 correspond to those of the protrusions 226 of the lower frame 220. An interval defined between a first notch and a second notch formed at the same side which is preferably smaller than the corresponding side length of the control PCB 260 (of FIG. 10).

The number of notches 290 and protrusions 226 are not required to be the same, and the number of notches 290 and protrusions 226 are not fixed. That is, if only the control PCB 260 is firmly coupled with the lower frame 220 via the notches 290 and the protrusions 226, the number of the notches 290 or the protrusions 226 may be varied.

Returning now to FIG. 5, a process for assembling the above-described liquid crystal display module 200 will now be explained.

At first, all the elements of the back light unit 240 are sequentially mounted on the lower frame 220. Then, the liquid crystal panel 210 is mounted on the back light unit 240 and is adjusted such that the lower frame 220 supports the liquid crystal panel 210. At this point, the source PCB 250 connected with the liquid crystal panel 210 is bent along a rear side wall 224b (of FIG. 6) of the lower frame 220 to fix the source PCB 250 on the lower surface of the back light unit 240. Thereafter, the control PCB 260 connected with the source PCB 250 via the FPC 280 (of FIG. 10) is coupled to the lower frame 220. The coupling method for coupling the control PCB 260 with the lower frame 220 will be explained later.

Thereafter, the two lower covers 300 are fixed to the lower frame 220 via a screw coupling, for example. Specifically, the two lower covers 300 are arranged to support, respectively, the front side wall 224a supporting the lamp 242 of the back light unit 240 and the rear side wall 224b opposing the front side wall 224a. Then, screws (not shown) are tightened through the first and second screw holes 306 and 308 of the lower cover 300 to fix the lower cover 300 to the lower frame 220.

Thereafter, the upper frame 230 is aligned over the lower frame 220 and pressed onto the liquid crystal panel 210 to fix between the upper and lower frames 220 and 230. At this point, the coupling segments 309a of the lower cover 300 are latched into the flexible concavities 232 of the upper frame 230. Though after the upper frame 230 and the lower frame 220 are coupled with each other, the control PCB 260 (of FIG. 9) can be easily removed from the lower frame 220 without disassembling the upper and lower frames 230 and 220. Before the control PCB is removed from the lower frame 220, the FPC (reference 280 of FIG. 10) is unlatched from the connector 330 (of FIG. 12A) of the control PCB 260 such that the control PCB 260 and the source PCB 250 (of FIG. 9) are separated. Alternatively, the FPC may be unlatched from the connector after the PCB is removed from the lower frame 220.

FIG. 10 is a bottom plan view illustrating the liquid crystal display module 200 assembled via the above-explained process. As shown, the control PCB 260 is mounted on the base plate 222 of the lower frame 220 and is electrically connected with the source PCB 250 via the FPC 280. The source PCB 250 is bent on the lower surface of the back light unit (reference 240 of FIG. 5).

Figure 12A:
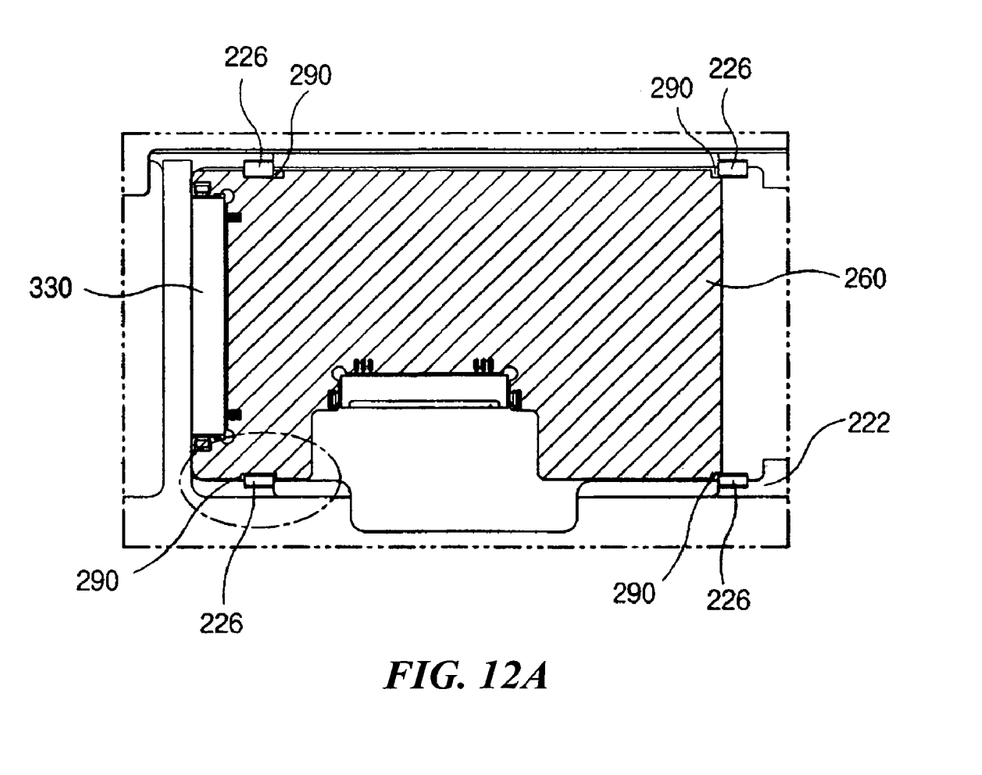
FIGS. 12A and 13A are expanded plan views illustrating a portion "A" of FIG. 10.
Figure 12B:
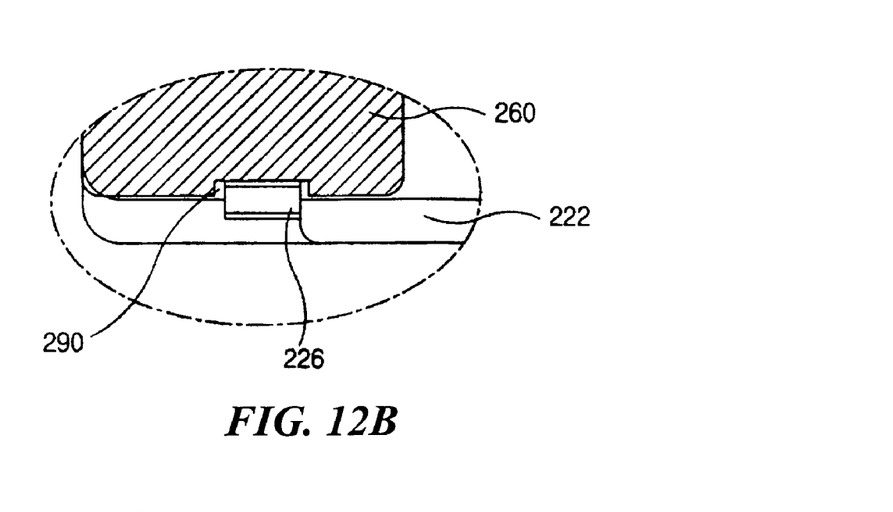
FIGS. 12B and 13B are partial expanded plan views of FIGS. 12A and 13A, respectively.
Figure 13A:
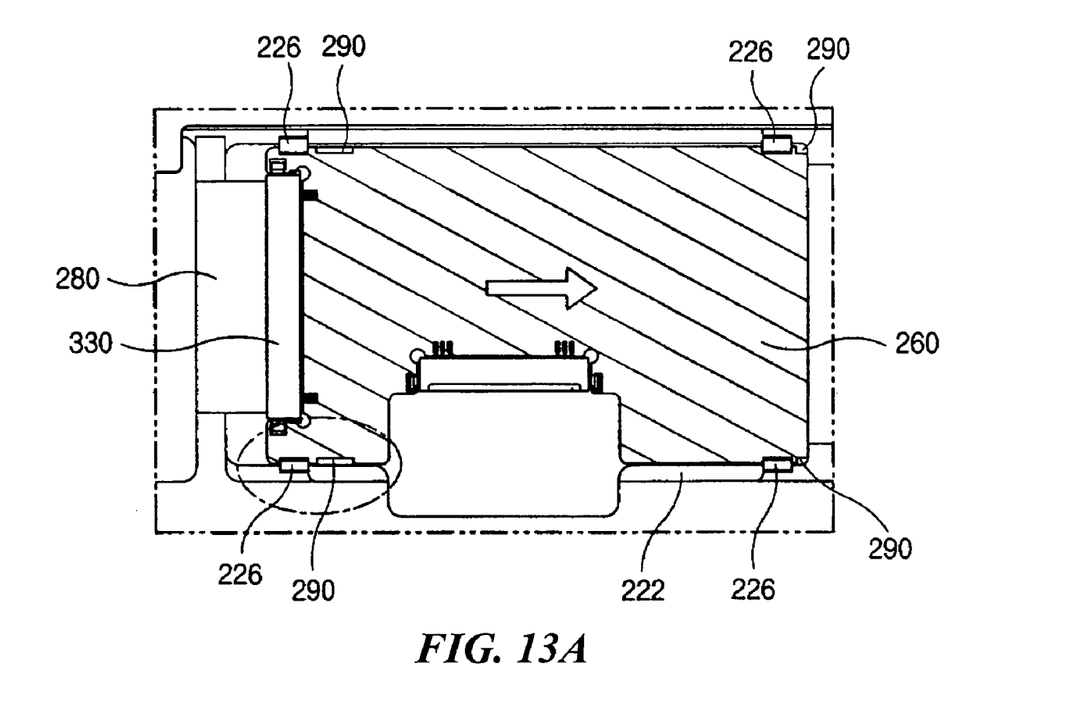
Figure 13B:
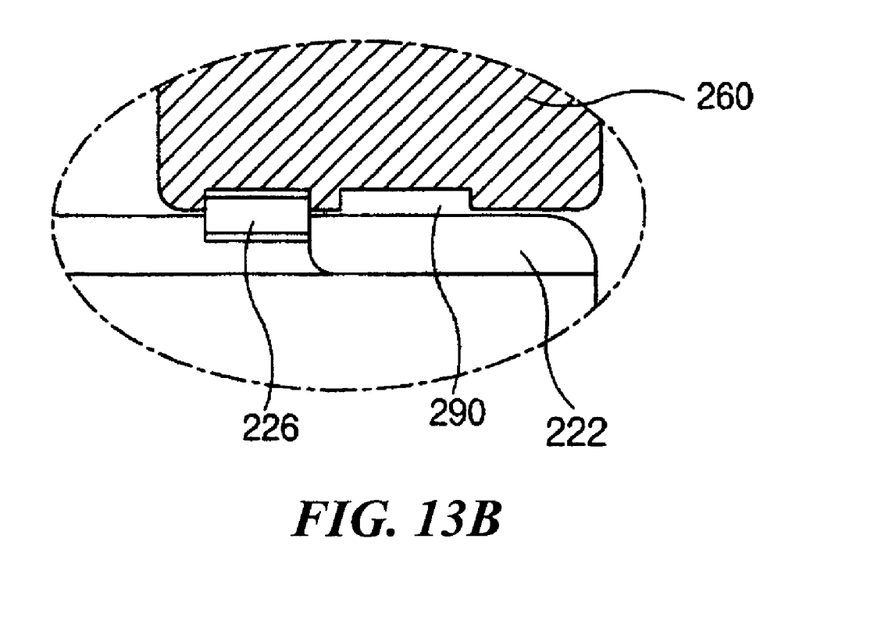

With reference to FIGS. 12A, 12B, 13A, and 13B, a method for mounting the control PCB 260 will be explained in detail. FIGS. 12A and 13A are expanded plan views of a portion "A" of FIG. 10, and FIGS. 12B and 13B are partial expanded views of FIGS. 12A and 13A, respectively.

In FIGS. 12A and 12B, the notches 226 of the control PCB 260 are respectively aligned to the coupling segments 290 formed on the base plate 222 of the lower frame (reference 220 of FIG. 6). Then, the control PCB 260 is slid in the direction of the arrow such that the notches 290 are away from the coupling segments 226. Thus, the coupling segments 226 squeeze the side edges of the control PCB 260 such that the control PCB 260 is coupled to the bottom plate 222 of the lower frame 220 (of FIG. 6).

After the control PCB 260 is coupled to the bottom plate 222, the FPC 280 connected with the source PCB 250 (of FIG. 10) is connected to the connector 330 of the control PCB 260 such that they are electrically connected. Alternatively, the FPC 280 may be connected to the connector 330 before the coupling of the control PCB 260 and the bottom plate 222.

Figure 14:
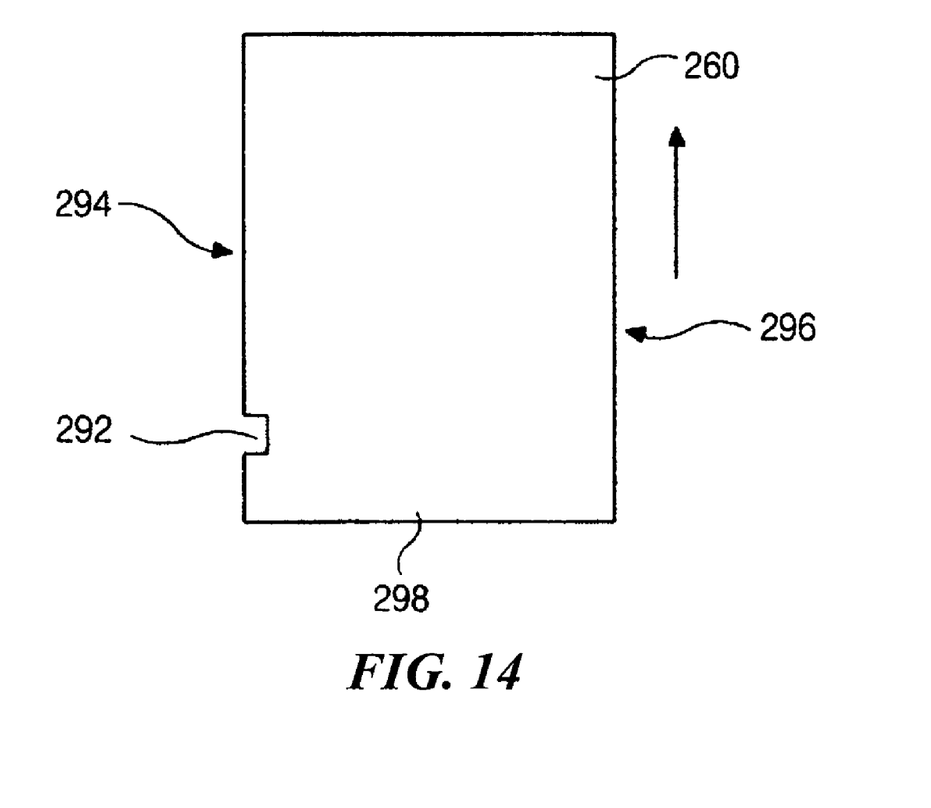
FIG. 14 is a plan view illustrating another exemplary second printed circuit board according to the present invention.
Figure 15A:
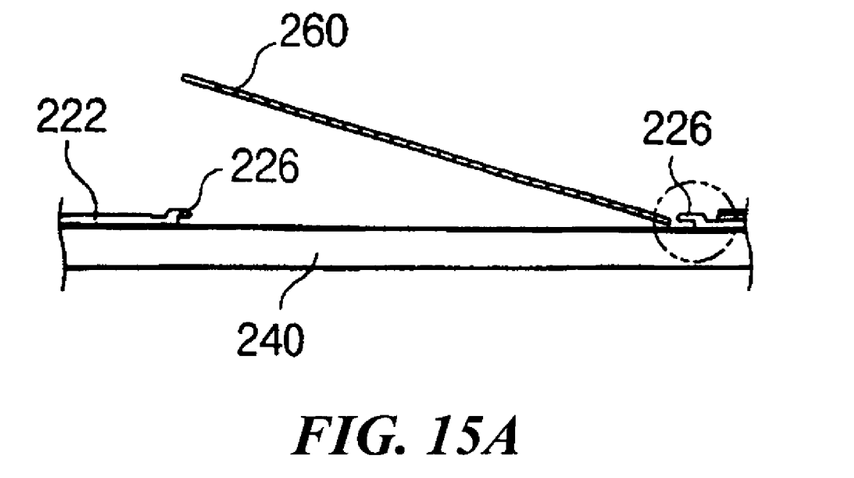
FIGS. 15A and 15B are respectively a side view and a partially expanded view illustrating a coupling configuration for the second printed circuit board of FIG. 14.
Figure 15B:
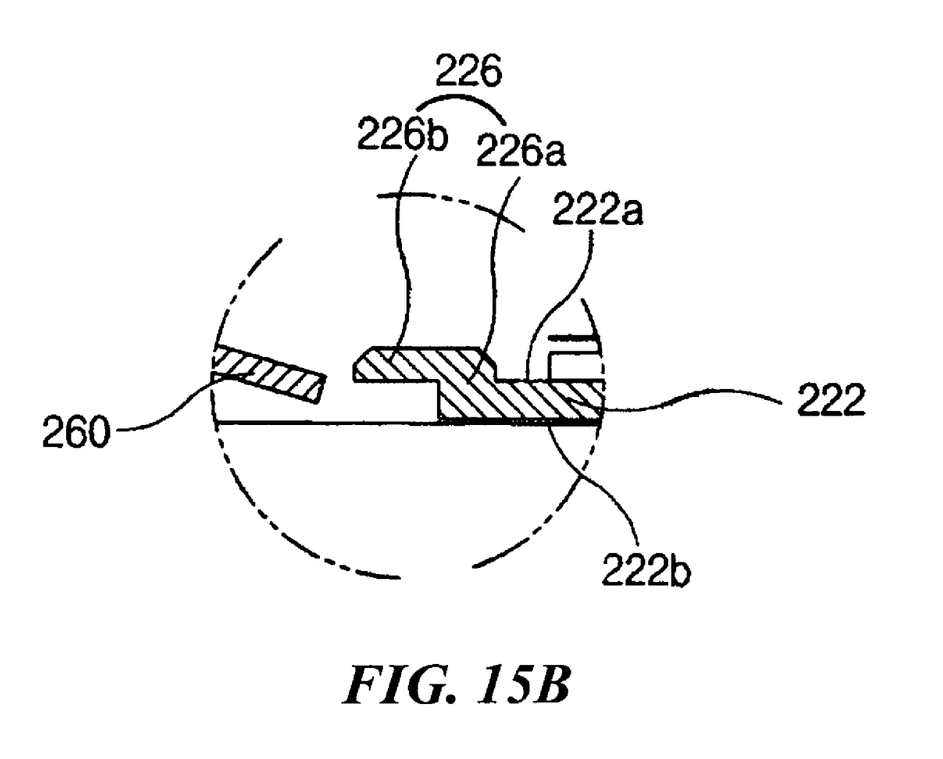

FIGS. 14, 15A, and 15B illustrate another configuration of the second printed circuit board. As shown in FIG. 14, the control PCB 260 has just one notch 292 at a first side edge 294, and there is no notch at a second side edge 296 opposite the first side edge 294. The notch 292 is preferably formed near a lower side edge 298 of the control PCB 260. In that case, as shown in FIGS. 15A and 15B, the second side edge 296 of the control PCB 260 is inserted into a gap under the coupling segment 226 formed at a first inner side of the basic plate 222 of the lower frame 220 (of FIG. 6). Then, the notch 292 is aligned to the coupling segment 226 formed at a second inner side opposing the first inner side of the basic plate 222. Thereafter, the control PCB 260 is slid in a direction of the arrow of FIG. 15A such that the coupling segments 226 squeeze the control PCB 260.

In an exemplary configuration, the coupling segments and notches couple the control PCB with the lower frame. The coupling segments and notches may alternatively be substituted with screws and screw holes or the like. In addition, though the coupling segment of the illustrated configuration is integrally formed with the lower frame, the coupling segment may be formed independently of the lower frame such to be removable from the lower frame.

As explained above, the present invention may provide a removable control PCB that can be separated from the lower frame and the source PCB without disassembling and reassembling of the upper and lower frames. Therefore, the driving circuits formed on the control PCB can be repaired or exchanged without additional complication, and contamination due to the dissembling or reassembling can be excluded. Further, because there is no screw or double-coated-tape used for fixing the PCB, the fabrication cost and yield are improved.

It will be apparent to those skilled in the art that various modifications and variation can be made in the liquid crystal display module of the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
    a liquid crystal panel including an upper substrate, a lower substrate, and a liquid crystal layer interposed between the upper and lower substrates;
    a first frame on which a source printed circuit board and a control printed circuit board are laterally spaced apart from each other along a horizontal direction; and
    a second frame coupled with the first frame such that the liquid crystal panel is fixed between the first and second frames,
    wherein the source printed circuit board is mounted on the first frame and is electrically connected with the liquid crystal panel, the control printed circuit board is electrically connected to the source printed circuit board to drive the liquid crystal panel, and the control printed circuit board being removable from the source printed circuit board and the first frame, and
    wherein the first frame has at least one first coupling segment and at least one second coupling segment to hold, respectively, opposing edge surfaces of the control printed circuit board, and the control printed circuit board and the liquid crystal panel are disposed on opposite sides of the first frame.

2. The liquid crystal display module according to claim 1, wherein at least one notch is formed at a first one of the opposing edge surfaces of the control printed circuit board.

3. The liquid crystal display module according to claim 2, wherein the control printed circuit board further has at least one notch at a second one of the opposing edge surfaces thereof.

4. The liquid crystal display module according to claim 1, wherein each of the first and second coupling segments has the shape of a hook.

5. The liquid crystal display module according to claim 1, wherein each of the first and second coupling segments has the shape of a capsized letter "L".

6. The liquid crystal display module according to claim 1, wherein a number of the first coupling segments and a number of the second coupling segments are the same.

7. The liquid crystal display module according to claim 6, wherein a first distance between two adjacent first coupling segments is smaller than a corresponding side length of the control printed circuit board, and wherein a second distance between the two adjacent second coupling segments is the same as the first distance.

8. The liquid crystal display module according to claim 1, further comprising a flexible printed circuit to electrically connect the source printed circuit board with the control printed circuit board.

9. The liquid crystal display module according to claim 8, wherein the flexible printed circuit is removable from the control printed circuit board.

10. The liquid crystal display module according to claim 1, wherein a tape carrier package electrically connects the source printed circuit board with the liquid crystal panel.

11. The liquid crystal display module according to claim 1, further comprising a back light unit having a lamp to produce light.

12. The liquid crystal display module according to claim 11, further comprising a lower cover to support the first frame to prevent wrinkling and bending of the first frame, the lower cover being coupled to the lower frame at a side of the lower frame where the lamp of the back light unit is disposed.

13. The liquid crystal display module according to claim 11, further comprising a lower cover to support the first frame to prevent wrinkling and bending of the first frame, the lower cover being coupled to the lower frame at a side opposite to the lower frame opposite the lamp of the back light unit.

14. A liquid crystal display module, comprising:
    an upper substrate;
    a lower substrate;
    a liquid crystal layer interposed between the upper substrate and the lower substrate;
    a backlight disposed on one of the upper substrate and lower substrate;
    first and second frames coupled together with the upper and lower substrates and backlight disposed between the first and second frames;
    at least one source printed circuit board; and
    at least one control printed circuit board laterally spaced apart from the at least one source printed circuit board along a horizontal direction,
    wherein the control printed circuit board is removable from the source printed circuit board and includes a plurality of notches disposed on opposing side edges of the control printed circuit board, and the control printed circuit board and the upper and lower substrates are disposed on opposite sides of the first frame.

15. The liquid crystal display module according to claim 14, wherein the source printed circuit board and the control printed circuit board are electrically interconnected via a printed circuit and a connector.

16. The liquid crystal display module according to claim 15, wherein the printed circuit is flexible.

* * * * *